Nov. 4, 1930.  J. B. YAZEL  1,780,693

EXHAUST CONNECTION

Filed March 25, 1926

Inventor

J. B. Yazel,

By Lacey & Lacey, Attorneys

Patented Nov. 4, 1930

1,780,693

UNITED STATES PATENT OFFICE

JACOB B. YAZEL, OF MARION, OHIO

EXHAUST CONNECTION

Application filed March 25, 1926. Serial No. 97,353.

The primary object of this invention is to provide a vent for the exhaust of gas, oil, steam or other engine of a portable nature, or serving as the power unit of a motor vehicle of any type.

The invention is particularly designed for fire engines which frequently require testing, adjusting and warming up of the motor. In cold weather the house is chilled upon opening the window, door or other outlet to provide an escape for the exhaust when the engine is running.

The present invention provides a vent and a connection between the exhaust pipe of the engine and the vent which maintains a close joint yet admits of the engine running free, the connection being automatic in coupling and uncoupling, thereby admitting of the engine being run out of or backed into place without manipulating connections which would be objectionable in fire apparatus.

While the drawings illustrate a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which—

Figure 1:
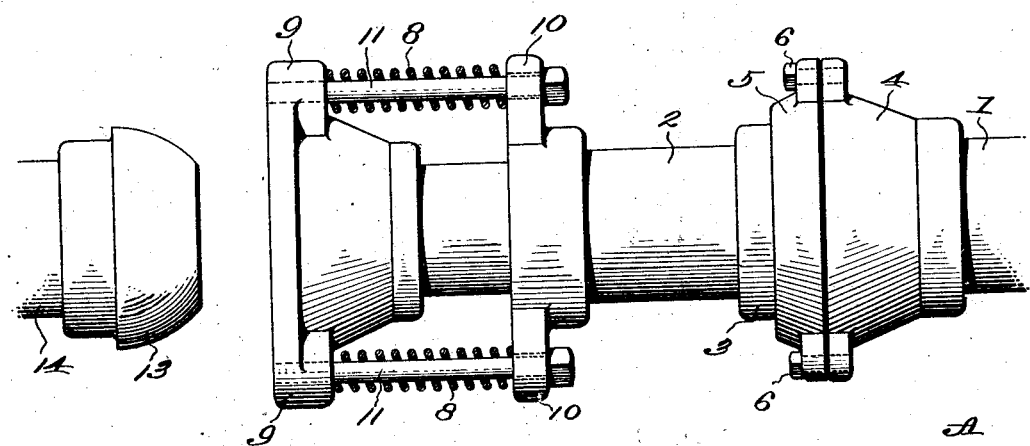
Figure 2:
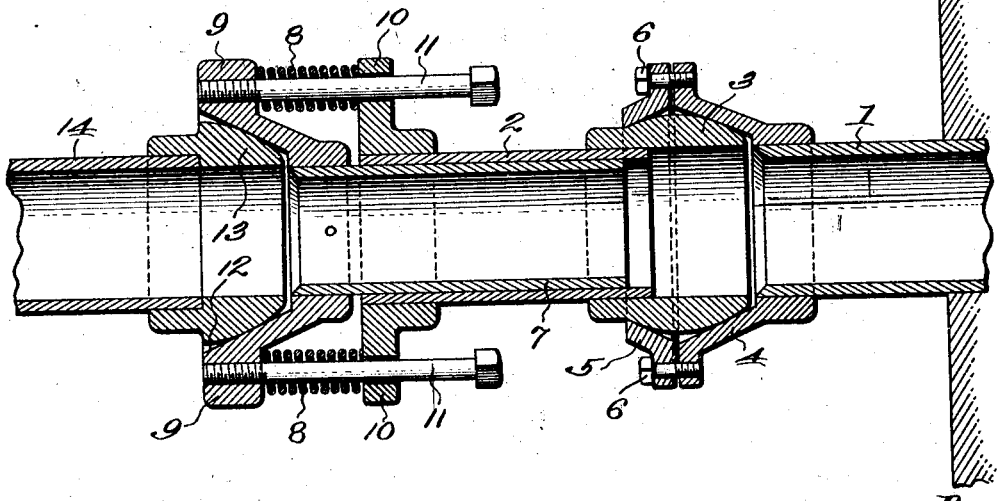

Figure 1 is a side view of an exhaust connection embodying the invention, showing the parts separated and partly in section, and Figure 2 is a central longitudinal sectional view showing the parts coupled.

Corresponding and like parts are referred to in the following description and designated in both views of the drawings by like reference characters.

The vent pipe is preferably of sectional formation and includes a universal joint to admit of ready coupling of the exhaust thereto when backing the engine into its accustomed place in the house. As shown, the vent pipe comprises pipe sections 1 and 2, the section 1 extending through a wall represented by the line A—B to discharge the exhaust from the engine into the open air or into a sewer or other convenient place. A universal joint connects the sections 1 and 2, so that the free end of the section 2 may be adjusted or positioned to receive the coupling end of the exhaust pipe when backing the engine into place. A ball member 3 is connected in any determinate way to the section 2 and is adapted to coact with a socket member 4 secured in any determinate way to the inner end of the section 1. A retaining ring 5 is secured to the socket member 4 and encircles the ball member 3 to hold the ball member 3 in place. The bolts 6 connecting the parts 4 and 5 may be tightened more or less to grip the member 3 between the members 4 and 5 to prevent a too free movement thereof so that the section 2 will maintain an adjusted position.

A section of pipe 7 is slidable within the section 2 and is normally held projected by open coil springs 8 interposed between members 9 and 10 and mounted upon guides 11 carried by the part 9 and slidable in openings of the part 10. The part 10 consists of a collar and is fast to the outer end of the section 2 and is provided with apertured ears through which the guides 11 are free to move. The part 9 is fast to the outer end of the section 7 and is formed with a flared opening 12 to receive a tapered member 13 fast to the delivery end of an exhaust pipe 14 leading from the engine to be coupled to the vent pipe. The member 13 consists of the segment of a sphere and is adapted to obtain a close fit within the flared opening 12 in any relative angular position of the exhaust and vent pipes. The parts 9 and 13 constitute elements of a ball and socket joint, thereby insuring a close fit when the exhaust and vent pipes are coupled, irrespective of their relative angular positions.

The numeral 14 designates the exhaust pipe from the motor or engine of the vehicle or apparatus, with which the motor is associated and when the exhaust and vent pipes are coupled, as indicated in Figure 2, the exhaust from the engine is discharged without necessitating the opening of any window or door of the house in which the engine is located. The coupling and the uncoupling between the exhaust and vent pipes is automatic and does not require any manipulation such as the screwing or unscrewing of the joint or like operation made necessary in the manipulating of pipe couplings.

Having thus described the invention, I claim:

Means for carrying off exhaust from a fire engine when operating in the engine house, the same consisting of a sectional vent pipe having one of the sections fixed in and extending through a wall of the engine house to discharge the exhaust clear thereof, and having a relatively movable section coupled to the fixed section by a universal joint, an extension pipe slidable within the movable section of the vent pipe, spring means normally holding the extension pipe projected, projections on the extension pipe and the movable section of the vent pipe, guides fixed in the projections on the extension pipe and slidable in the projections on the movable section of the vent pipe and having stops adapted to abut the latter projections to limit the forward movement of the extension pipe, an exhaust pipe on the fire engine adapted to freely connect with and disconnect from the said extension pipe, and a universal joint having its elements secured upon the contiguous ends of the said exhaust and extension pipes.

In testimony whereof I affix my signature.

JACOB B. YAZEL. [L. S.]